Figure 1:
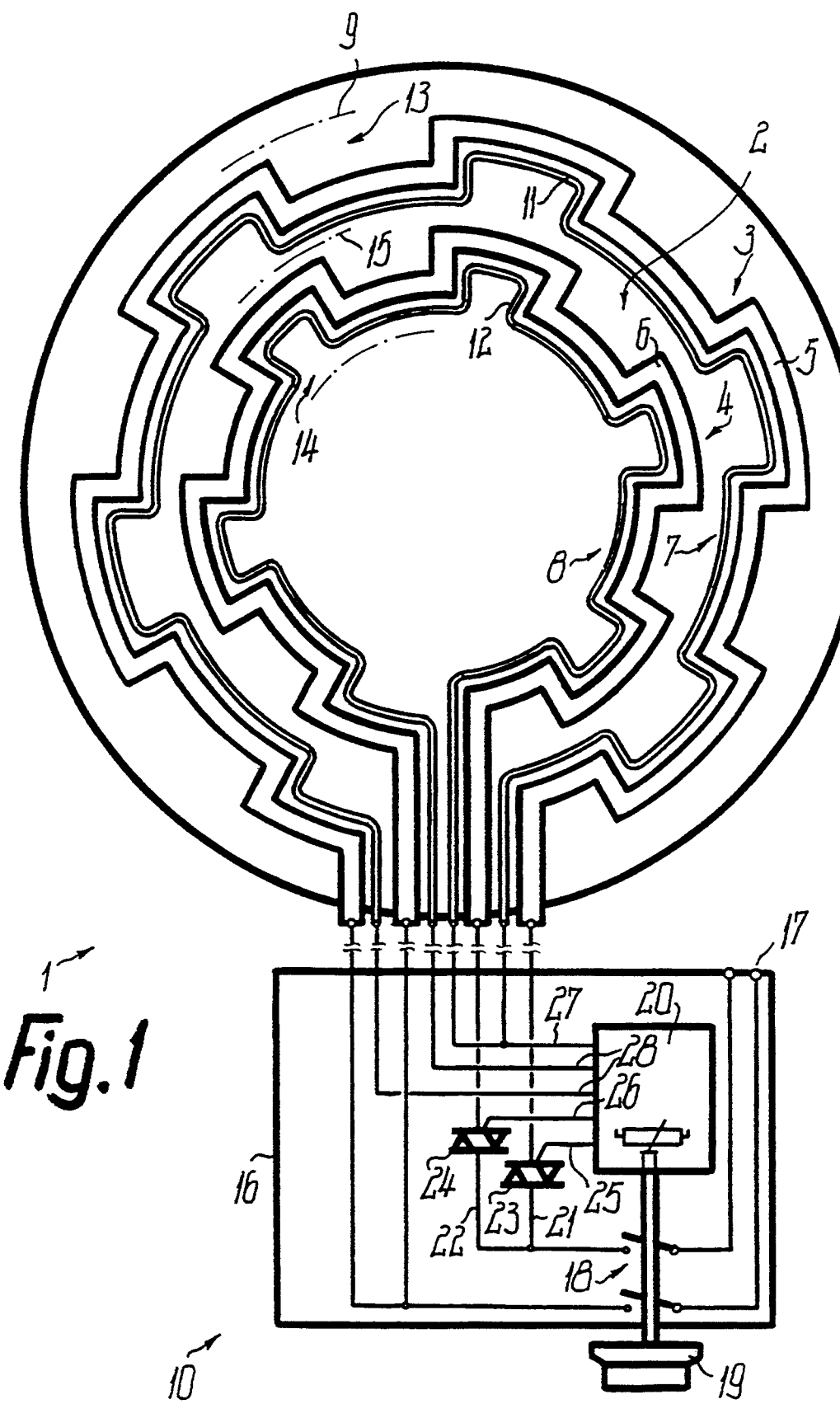

United States Patent

Schilling et al.

[11] Patent Number: 5,396,047
[45] Date of Patent: Mar. 7, 1995

[54] ELECTRIC HEATING UNIT WITH ALTERNATELY HEATED SURFACE AREAS

[75] Inventors: Wilfried Schilling, Kraichtal-Mue; Robert Kicherer, Oberderdingen, both of Germany

[73] Assignee: E.G.O. Elektro-Gerate Blanc u. Fischer, Germany

[21] Appl. No.: 944,445

[22] Filed: Sep. 14, 1992

[30] Foreign Application Priority Data

Sep. 12, 1991 [DE] Germany ............... 41 30 337.7

[51] Int. Cl.[6] .......................... H05B 1/02; H05B 3/68; F24C 7/06
[52] U.S. Cl. .............................. 219/449; 219/446; 219/510
[58] Field of Search ............ 219/449, 448, 452, 451, 219/464, 446, 486, 494, 497, 508, 510

[56] References Cited

U.S. PATENT DOCUMENTS

| | | | |
|---|---|---|---|
| 4,061,870 | 12/1977 | Mizushina | 373/136 |
| 4,282,422 | 8/1981 | Payne et al. | |
| 4,394,564 | 7/1983 | Dills | 219/449 |
| 4,441,015 | 4/1984 | Eichelberger et al. | 219/486 |
| 4,697,068 | 9/1987 | Schreder | 219/449 |
| 4,740,664 | 4/1988 | Payne et al. | 219/449 |
| 4,786,799 | 11/1988 | Welle, Jr. et al. | 219/486 |
| 4,829,159 | 5/1989 | Braun et al. | 219/486 |
| 4,836,138 | 6/1989 | Robinson et al. | 118/725 |
| 5,001,328 | 3/1991 | Schreder et al. | 219/449 |
| 5,043,559 | 8/1991 | Scott | 219/464 |
| 5,227,610 | 7/1993 | Schultheis et al. | 219/449 |
| 5,270,519 | 12/1993 | Higgins | 219/464 |

FOREIGN PATENT DOCUMENTS

| | | |
|---|---|---|
| 2705528 | 8/1978 | Germany. |
| 2749765 | 5/1979 | Germany. |
| 2932844 | 2/1981 | Germany. |
| 3334425 | 4/1985 | Germany. |
| 3539581 | 5/1987 | Germany. |
| 3545454 | 7/1987 | Germany. |
| 3810586 | 10/1989 | Germany. |
| 3903978 | 8/1990 | Germany. |
| 4007680 | 9/1991 | Germany. |
| 4022846 | 1/1992 | Germany. |
| 2064239 | 6/1981 | United Kingdom. |
| 2067880 | 7/1981 | United Kingdom. |
| 2067857 | 7/1991 | United Kingdom. |
| 0961161 | 9/1982 | U.S.S.R. . |

Primary Examiner—Bruce A. Reynolds
Assistant Examiner—John A. Jeffery
Attorney, Agent, or Firm—Quarles & Brady

[57] ABSTRACT

A heating unit (1) for a cooking point has an outer heater (3) and an inner heater (4) located concentrically for separately heating an associated surface area (13, 14) of the overall heating surface (2). The two heaters (3, 4) can be differently regulated such that supplied power is periodically switched over and distributed in very short, but variable time intervals in a continuously alternating manner to the two heaters (3, 4). Switching over takes place in the passage of the alternating current characteristic through the zero line. Thus, without influencing a clicking rate, there can be a random power distribution on at least two surface areas (13, 14) of the same heating surface (2) and a high efficiency with a relatively simple control (10).

36 Claims, 2 Drawing Sheets

ELECTRIC HEATING UNIT WITH ALTERNATELY HEATED SURFACE AREAS

DESCRIPTION

The invention relates to an electric heating unit, which is particularly intended for a cooking point or other areas to be heated, in which by heat conduction and/or radiation thermal energy is to be supplied to the vicinity of a heating surface.

In the case of such heating units, e.g. electric hotplates, there can be a temperature regulation or control of the power received or delivered by separate heating resistors. For this purpose a temperature sensor in the circularly heated area, in the unheated centre or at another point can be directly exposed to the radiation of at least one heating resistor and/or a heating or hotplate body and on reaching a given, manually set temperature the power of at least one heating resistor is partly or completely switched off and after reaching a lower limit temperature is switched on again. If a power control device is provided, then the latter periodically switches on and off the said power, the relative on period increasing with a higher set temperature.

Particularly in the case of a large power decrease, such as is e.g. encountered when heating large quantities of water, the switching operations of the control or regulating system can lead to disadvantageous switching pulses and in particular to an inadmissible clicking rate. In addition, in different heating surface areas the thermal energy removal can differ and also change, so that a desired different or uniform temperature distribution is undesirably changed over the surface, without it being possible to counteract these changes. With a cooking utensil usually the bottom is in contact with the cooking or heating surface in the vicinity of the outer circumference, whereas it is contact-free in the centre, so that in this area the heating surface is subject to a significant temperature rise due to the lack of a good heat transfer.

The problem of the invention is to provide a heating unit, which avoids the disadvantages of known constructions or of the described type and which in particular permits a reciprocal relative adaptation of the temperature in the separate heating surface areas.

According to the invention two or more adjacent, interconnected surface areas, which pass into one another and/or are located within a common circumferential boundary of the heating surface can be separately regulated. As a result the temperature or heating power for each of these surface areas can e.g. be adapted to the amount of thermal energy taken from the particular surface area compared with at least one other surface area. If this ratio changes in the course of time, then a temperature regulation can take place. This makes it possible, substantially independently of the heat removal, to keep the two surface areas at the same temperature or maintain same at a desired temperature deference, which can e.g. be modified in a time and/or temperature-dependent manner.

Appropriately the temperature regulation does not take place by modifying the thermal coupling of the surface areas, but by modifying the power supplied to the associated heaters, particularly the supplied electrical power. It is advantageous if, on reducing the power supplied to the surface area by a given amount, to roughly supply said power amount to another area of the equipment associated with the heating unit, particularly a different surface area of the same heating surface, so that the total power consumption remains substantially constant. As a result the desired temperature difference between the surface areas is more rapidly achieved by an opposing regulation of the two surface areas.

The problem of the invention can also be advantageously solved in that at least one specific power quantity is periodically and alternately switched to at least two surface areas. On operating with alternating current the longest period time is advantageously significantly shorter than one second or half a second. Switching over preferably takes place at the instant of the passage of the wave-like alternating current characteristic through the average zero line, so that no interference pulses occur. If the switching on process for one surface area takes place at virtually the same time as the switching off process for the other surface area, then there is no interruption in the power delivered by the power supply, so that the switching process causes no acoustic or clicking pulses.

This is further improved if the heaters between which switching takes place have essentially the same absorption or rated power. On switching between at least two heaters or heating circuits, e.g. the time intervals of the power supply for all the heaters can be made roughly the same, so that all the heaters contribute with substantially the same percentage to the total heating power of the heating surface. If as a result of reduced heat removal in the heating area of a heater there is a corresponding temperature rise, then the latter is detected by a temperature sensor and by an automatically operating control or a control operating in temperature-dependent manner the duration of the time intervals of the power supply to said heater is reduced, whilst the corresponding duration for at least one further heater is increased until the temperature distribution corresponding to a setting has been restored. For example, of the 20 full waves of the alternating current characteristic in such case, 5 full waves per time interval can be supplied to the heater of the hotter area and 15 full waves to the heater of the cooler area, which corresponds to a power distribution of 25 to 75%. As in the case of alternating current of 50 Hz, 50 full waves are available, the shorter time interval is only 1/10 second, whereas the longer time interval is approximately ⅓ second. As soon as the desired temperature distribution is reached, it is possible to automatically switch over in such a way that the in each case desired distribution is maintained.

For determining the temperature or temperature changes in the particular surface area, temperature sensing can directly take place through at least one associated heating resistor, e.g. if the latter is constructed as a PTC or NTC resistor. The heating resistor disconnected from the heating supply during the associated disconnection or switch-off time interval, can also be connected as a resistance temperature sensor. However, it is also advantageously possible for one, at least two or all the heaters to have in each case at least one separate temperature sensor, which essentially only determines the temperature of the associated surface area and/or the associated heater, so that the temperatures of the different areas are simply determined and can electronically and automatically be compared with one another, so that the comparison value can be used as a function for the switching processes.

The described readjustment by a relative modification of the time intervals is particularly appropriate if large thermal energy quantities are removed, such as is e.g. the case if large cooking product quantities with a high water proportion are to be heated in a large cooking vessel from ambient temperature roughly to boiling point. In the case of cooking products with a smaller energy requirement, e.g. pan dishes, which are not to be heated with the full or maximum power of the heating unit, but instead with a heating power roughly reduced by half, it is desirable to have a very uniform heating of the pan bottom and therefore also a temperature increase in the particular surface area where the heat transfer is poorer. In order to be able to operate in both operating modes, it is appropriate to provide said readjustment of the time intervals only as from a predetermined temperature level, which is higher than 250° C. and is preferably at 300° C., said temperature only being a few degrees, e.g. 30° to 50° C. below the maximum temperature at which the power supply is switched off by an overheating protection means, The transfer from switching with constant time intervals to readjusting time intervals can take place as a function of the switching position of the control unit, with which the power of the heating unit can be manually adjusted and/or said transfer can take place automatically in temperature-dependent manner in that a temperature sensor detects said transition temperature. The switching beck to constant time intervals can then once again take place manually and/or in temperature-dependent manner.

As a result of the described temperature monitoring of the heating surface or surface areas an overheating protection is also provided, so that there is no need for a separate temperature switch or sensor for overheating protection purposes. The described construction can also be used for pot detection or for automatic detection as to whether the heating surface is being operated under no-load conditions without planned heat removal or the latter e.g. takes place by a pot standing on the heating surface. For this purpose the power, the temperature and optionally the duration thereof can be electronically compared and it is possible to derive from the resulting value whether or not the heating unit is operating on a no-load basis. In addition, the power distribution or the temperature distribution between at least two surface areas can be determined for this purpose. If said distribution is particularly uniform, it corresponds to the fact that no heat removal is taking place and after a preprogrammed or preadjusted time period the control means switches off at least part of the supplied power. As soon as then a heat removal takes place, said power is automatically connected in again.

Instead of switching the power in the described manner between separate heating surfaces spaced from one another or their heaters, switching appropriately takes place between surface areas of a single heating surface. The particular heating surface is in particular defined by a substantially closed circumference and an approximately continuously heated ring zone, whose circumference is substantially symmetrical to an axial plane or a central axis of the heating surface. In the case of a cooking point, said heating surface forms a heated standing surface for a single cooking vessel which is substantially uninterrupted at least along the circumference as a result of the construction according to the invention, e.g. in the case of a cooking point, the precooking times can be significantly shortened. For continuous or extremely rapid electronic switching it is possible for triacs to be used as the relays, so that no switching pulses act on the main supply. If a particularly high precooking power is to be made available, then by a corresponding manual setting also at least two surface areas or the associated heaters can be operated simultaneously and substantially without switching at their rated power or capacity until, in time and/or temperature-dependent manner, only a part of said increased power is switched in the described manner between the surface areas.

These and further features can be gathered from the claims, description and drawings and the individual features, either singly or in the form of sub-combinations, can be realized in an embodiment of the invention and in other fields and can represent advantageous, independently protectable constructions for which protection is hereby claimed. An embodiment of the invention is described in greater detail hereinafter relative to the drawings, wherein show:

FIG. 1 An inventive heating unit in a simplified view.

Figure 2:
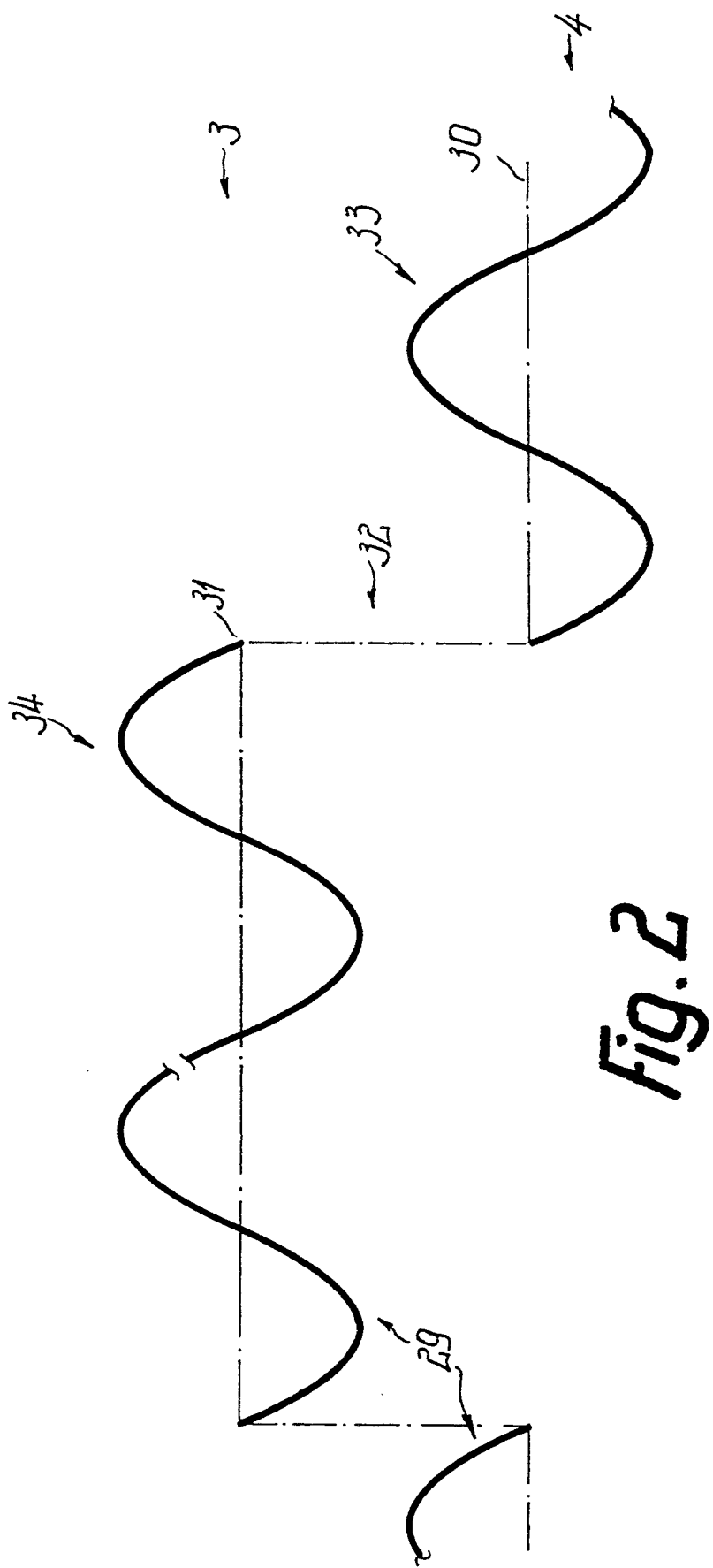

FIG. 2 The switching process by means of an alternating current characteristic.

The heating unit 1 can at least partly be constructed as a radiant heating body for placing on a translucent glass ceramic or similar cooking plate, as a heating unit constructionally combined with such a cooking point or plate, as an electric hotplate with a metal hotplate body or the like and is preferably constructed as a thermally low-mass hotplate in thick film technology, The thermal storage capacity and/or conductivity of its material is appropriately specifically much lower than that of a metallic material, particularly cast steel. For the formation of heating areas there are only two heaters 3, 4 or heating resistors 5, 6, which in each case from a closed, separate controllable or regulatable heating circuit separate from the other heater.

The heaters 3, 4 are used for heating in the vicinity of a heating surface 2. In the case of a radiant heater, prior to its installation on the back of a glass ceramic plate, the heating surface 2 can be understood as a substantially planar area, in which are located the heaters 3, 4 or up to which extend the heating resistors 5, 6 with their front or top surface remote from a thermally and/or electrically insulating carrier or support. The heating resistors 5, 6 are e.g. positioned on the base surface of said pot-shaped insulating support, whose pot edge is so fixed to the back of the hotplate that the front of its edge is substantially closed or engages tightly with pressure on the hotplate and the heaters 4, 5 are located within the pot edge.

After connecting the radiant heater to the hotplate, in the case of providing at least one heating resistor on the back of the hotplate as a coated-on thick film resistor and in the case of a heating unit, in which at least one heating resistor in the form of a resistance coil, tubular heater, etc. is fixed or embedded in electrically insulating manner on the back of the hotplate, the heating surface 2 is to be understood as the substantially planar side of the hotplate or plate body remote from the heating resistor. The heating surface 2 is outer circumferentially bounded in the area up to which at least one heater 3 acts in a thermally defined manner a short time after its switching on, the radial spacing of the outer circumference or the outer boundary 9 of the heating surface 2 from the outermost area of the heaters 3, 4 being much smaller than the radial extension thereof.

With each heater 3, 4 is associated a separate temperature sensor 7, 8, which appropriately senses roughly in the area of the associated heater 3, 4 and/or immediately adjacent to said side of the heater 3, 4 facing the centre of the heating surface 2. Temperature sensing can take place substantially along the entire associated heating resistor 6 or 7. The temperature sensing can also take place roughly in the plane of the associated heater 3 or 4 or, e.g. in the case of a radiant heater, close to or at the back of the hotplate, from which the particular heater 3 or 4 in exposed manner can have an internal spacing. For the control of the heaters 3, 4, either manually or automatically as a function of defining quantities, a control unit 10 is provided, which appropriately forms a subassembly separate from the heated subassembly and is connected to the heated subassembly by means of flexible connecting lines. The control unit 10 is used both for the manual setting of the desired temperature or heating power of the heated subassembly and for automatically performing regulating processes on the basis of temperature values, which are passed by temperature-dependent variable precision resistors 11, 12 of the temperature sensors 7, 8, via signal lines to the control or regulating elements of the control unit 10.

The heating resistors 5, 6 are approximately closed and ring-like and positioned coaxially within one another and the strip-like, elongated heating resistor 5 or 6 has, within its ring path, a meandering course, which in the circumferential direction has interconnected circumferential portions with different radial spacings from the centre of the heating surface 2 and pass into one another via roughly radial intermediate portions, the circumferential portions only having two clearly different radial spacings from the centre, which are roughly of the same length and whose length is significantly greater than the width. The particular precision resistor 11 or 12 which is much narrower than the width of the heating resistor is roughly parallel and with a limited, approximately constant spacing, adjacent to the associated longitudinal edge of the associated heating resistor 5 or 6, so that the precision resistor 11 or 12 also has a meandering course and is approximately closed in ring-like manner. The particular precision resistor 11 or 12 can, as a thick-film sensor, be coated directly onto the back of the hotplate, e.g. by printing on.

Through the heating action of the particular heater 3 or 4, in the heating surface is determined a substantially circularly closed surface area 13 or 14, whose radial ring width is greater than the corresponding strip width of the associated heating resistor 5 or 6 and is also slightly larger than the associated width of the surface field over which the heater 3 or 4 extends due to its meandering course, because the heater 3 or 4 acts in a clearly measuring and sensing way slightly beyond said surface field as a result of radiation and/or heat conduction. The outer circumference of the outer surface area 13 defines the outer boundary 9 of the heating surface 2 and within the inner circumference of the inner surface area 14 no heating is provided and the width of this unheated inner field is at least $\frac{1}{3}$ as large as the width of the outer circumference 9. Between the two contacting or transition-free heaters 3, 4, the two surface areas 13, 14 are interconnected by means of a circular boundary zone 15 roughly parallel thereto and which is located between the said surface fields of the heating resistors 5,6 and appropriately forms a band-like boundary zone and not a linear or gap-like zone, in which both heaters 3, 4 can act by radiation and/or heat conduction during operation, said boundary zone being connected substantially to both surface fields. Thus, between the inner circumference and the outer boundary 9 there is a substantially continuous heating of the heating surface 2. In the case of a hotplate the outer boundary 9 defines the size of the base standing surface of the cooking vessels to be used on said hotplate. In place of a circular boundary 9, it would also be possible to have a rectangular, oval or other boundary. With respect to the thermal action, the outer boundary 9 is only slightly interrupted where the connection ends of the heating resistors 5, 6 are passed outwards transversely to the central axis of the heating surface 2.

The regulating and control unit 10 has an e.g. casing-like base 16 made from an electrically insulating material, in which are located preferably in completely flush or encapsulated manner all the electrically conductive parts with the exception of the terminals for the connecting lines to the heated subassembly and terminals 17 for the power supply or equipment lines. The base 16 is e.g. to be fixed to the inside of an operating member of the associated appliance, such as a cooker and has a handle 19 projecting in freely accessible manner over its outside for the manual setting of the desired operating state. The handle 19 is appropriately located on a regulating shaft for the operation of contacts, particularly switching contacts 18, with which it is possible to open and close connecting lines between the terminals 17 and the remaining electrically conductive parts in an all-pole manner. Starting from a zero or neutral position of the handle 19, in which the switching contacts 18 are opened, a first rotation switching step serves to close the contacts 18 and further rotary steps serve to set the different operating modes.

The switching shaft or handle 19 also acts on an electronic control device 20, which is located as a separate subassembly within the base 16. The two connecting lines from the terminals 17 are connected after the switching contacts 18 to the associated connecting ends of the heating resistors 5, 6 and one connecting line is branched in separate terminal lines 21, 22 for in each case one connection end of each of the heating resistors 5, 6. In each of the terminal lines 21, 22 is connected an electronic relay 23 or 24, whose function states are controlled by the control unit 10 by means of in each case one control line 25 or 26. The connection ends of the precision resistors 11, 12 are connected separately by means of signal lines 27, 28 to inputs of the control device 20, which processes the absolute temperatures, their differences and optionally their time duration measured by the temperature sensors 7, 8 and derives therefrom control signals to be passed on to the relays 23, 24. The control is provided in such a way that either both the relays 23, 24 are closed for the flow of current, or alternatively one relay is closed and the other open and on switching the opening or closing of one relay takes place at the same time as the closing or opening of the other.

The control unit 10 can be a power control device and/or a temperature regulator operating in timing manner on the basis of a control heating means and which by means of one or both temperature sensors monitors the temperature in the vicinity of the heating surface 2 in such a way that on reaching a set temperature the electric power supplied to the heaters 3, 4 is regulated down and on dropping below a predetermined, lower temperature limit is supplied to the full extent again. Simultaneously the control device 20 operates in the manner of a full-wave control, so that it only switches the relays 23, 24 at the instant in which the characteristic of the supplied alternating current, after ending a full characteristic wave is in the passage through the zero line, on whose two sides are located the wave crests of the characteristic.

FIG. 2 shows the characteristic 29, including the zero line 30, in two planes and namely in the upper plane during the power supply of the outer heater 3 and in the lower plane during the power supply of the inner heater 4. The relays 23, 24 are e.g. operated in such a way that successive wave groups from e.g. 20 interconnected full waves of the characteristic 29 in each case are supplied in random different or identical distribution, with a single division, for the power supply of time connected two heaters 3, 4. Of the 20 full waves of each wave group e.g. a partial wave group 33 with eight continuously connected full waves can be supplied to the heater 4 and then by switching 32 the remaining partial wave group 34 with 12 full waves can be supplied to the heater 3 and then after a further switching 32 the next partial wave group is again supplied to the heater 4, etc. The ratio of the number of waves between the two partial wave groups 33, 34 can remain constant or can be variable, e.g. in temperature-dependent manner. The switching 32 in each case takes place during the passage 31 of the characteristic 29 through the zero line 30.

The described periodic switching can be provided in each temperature or set power range of the heating unit, i.e. also in the lower or lowest power range, but appropriately it is in the higher or highest power range, because then a poor heat removal in a surface area 13 or 14 can rapidly lead to an overheating thereof. In at least one power range, e.g. in the lower or lowest power range, the size of the two partial wave groups 33, 34 can be roughly the same, whereas only in the higher or highest power range does said differentiation of the relative sizes take place, e.g. in order to take account of the fact that cooking vessels generally allow a better heat transfer in the outer surface area 13 than in the inner surface area 14. The differentiation of the relative sizes can increase stepwise or continuously with increasing temperature in the vicinity of the heating surface 2.

Through the periodic switching, by means of a crossover network, from a single lead the electrical energy is continuously or only with very short interruptions distributed to at least two heaters 3, 4 of the same heating field. The time intervals of the allocation or interruption are so short compared with the thermal inertia in the vicinity of the heating surface 2, that the temperature of the particular surface area during the allocation either does not rise or only rises insignificantly above the temperature during the interruption of the allocation, or during said interruption the temperature does not drop or only drops insignificantly below the temperature during the allocation. Due to the short time intervals, in the vicinity of the heating surface 2 or the surface areas 13, 14 there are constant temperatures or continuous temperature changes in the same direction over numerous switching periods, because always both or all the heaters 3, 4 remain simultaneously in operation and during the allocation intervals, due to their thermal inertia, they do not significantly cool below their operating temperature and instead, prior to such a cooling, they are already supplied again with electric power.

We claim:

1. An electric heating unit comprising:
    at least one heating surface (2) defining separately heatable first and second surface areas for delivering thermal energy;
    at least two electric heaters (3, 4), each having an individual rated operating capacity and each mainly heating one of said first and second surface areas (13, 14); and
    control means (10) for alternately delivering operating power to each of said electric heaters (3, 4) to provide first and second temperature levels during heating operation, said control means (10) including temperature sensing means (7, 8),
    said control means separately thermally controlling said at least two surface areas (13, 14), said control means simultaneously substantially individually detecting and comparing withdrawal of thermal energy from said first and second surface areas, wherein said control means (10) is provided for reciprocating power supply to said at least two electric heaters (3, 4) in intervals, said control means withdrawing a first quantity of said operating power from said first electric heater and delivering said first quantity to said second electric heater when said sensing means detects a decrease of said first temperature level below a predetermined value, thereby raising supply of said operating energy to said second electric heater with respect to supply of operating energy to said first electric heater, said control means withdrawing a second quantity of said operating energy from said second electric heater and delivering said second quantity to said first electric heater when said sensing means detects a drop of said second temperature level below a predetermined value, thereby raising supply of said operating energy to said first electric heater with respect to a supply of operating energy to said second electric heater.

2. The electric heating unit according to claim 1, wherein said unit is provided for heating at least one single cooking point.

3. The heating unit according to claim 2, wherein said electric heaters (3, 4) and said surface areas (14) are associated with only one said single cooking point providing a contact face for a single cooking utensil, with respect to thermal output at least one of said electric heaters (3, 4) being arranged substantially axially symmetrically to said contact face.

4. The heating unit according to claim 1, wherein said power supply is substantially constant over a time period of at least two intervals.

5. The heating unit according to claim 1, wherein each of said electric heaters (3, 4) has a thermal inertia having a time lag of a temperature drop from a given operationally heated condition, said intervals being substantially equal to or shorter than at least one of said time lags.

6. The heating unit according to claim 1, wherein said control means (10) periodically shifts at least part of said power supply between said at least two electric heaters (3, 4), said power supply being a substantially constant rated power.

7. The heating unit according to claim 6, wherein said control means (10) performs reversing operations to alternate the power supply to said first and second heaters, said reversing operations being controlled as a function of temperature changes in the vicinity of at least one of said surface areas (13, 14).

8. The heating unit according to claim 1, wherein at least one of said intervals and a period duration between two corresponding switching operations are variable, said intervals being time intervals.

9. The heating unit according to claim 1, wherein said power supply is provided by alternating current defining an alternating characteristic graph (29), said control means (10) connecting one of said electric heaters (3 or 4) to said power supply substantially at a same point of said characteristic graph (29) as disconnecting the other one of said electric heater (4, 3) from said power supply.

10. The heating according to claim 9, wherein said control means (10) electronically switches said power supply substantially free of interruption of flow of said power supply.

11. The heating unit according to claim 9, wherein said characteristic graph (29) has a zero power level (30) and said control means (10) defines operating states provided by switched on states, switched off states and reversing states, at least one of said operating states taking place substantially at a point of intersection of said characteristic graph (29) and said zero level (30).

12. The heating unit according to claim 1, wherein said control means (10) define reversed operating states defining individual power inputs, at least two of said power inputs being substantially equal.

13. The heating unit according to claim 1, wherein in heating operation at least two of said electric heaters (3, 4) are constantly operated with a rated power of said power supply, at least two of said electric heaters (3, 4) being exclusively controlled by switching on and switching off as a function of time intervals defined by switched on states of said electric heaters.

14. The heating unit according to claim 1, wherein said control means (10) has period durations of power supply states, at least one of said period durations being less than one second.

15. The heating unit according to claim 1, wherein said power supply provides alternating current having groups of complete current wave forms, at least one of said electric heaters (3, 4) being supplied exclusively by said groups.

16. The heating unit according to claim 1, wherein separate temperature sensors (7, 8) are provided for each of said surface areas (13, 14).

17. The heating unit according to claim 1, wherein said surface areas (13, 14) are substantially constantly operable at a first reduced temperature level and a second increased temperature level, said power supply being reversed at said first temperature level as a function of time and at said second temperature level as a function of temperature.

18. The heating unit according to claim 1, wherein said second temperature level is limited by a minimum temperature of substantially 250° C.

19. The heating unit according to claim 1, further comprising means for manually varying at least one of said intervals.

20. The heating unit according to claim 1, wherein said surface areas (13, 14) are substantially constantly operable with different operating temperatures.

21. The heating unit according to claim 1, wherein said control means (10) includes an overheating protection means.

22. The heating unit according to claim 1, wherein said control means (10) controls a rated input power as a function of a maximum temperature, said control means (10) disconnecting at least part of said input power from at least one of said electric heaters (3, 4) upon occurring of said maximum temperature.

23. The heating unit according to claim 1, wherein said unit has a basic body having poor thermal capacity, said temperature sensing means (7, 8) being provided for sensing in the vicinity of said basic body.

24. The heating unit according to claim 1, wherein at least one of said electric heaters (3, 4) is provided by at least one separate heating resistor (5, 6) arranged in a first heating circuit separate from at least one second heating circuit.

25. The heating unit according to claim 1, wherein each of said electric heaters (3, 4) is arranged in a heating circuit separate from the other electric heaters.

26. The heating unit according to claim 1, wherein said unit has a rated total input capacity, said individual rated operating capacity of each of said heaters (3, 4) being substantially equal to said total input capacity of said heating unit (1).

27. The heating unit according to claim 1, wherein said heaters (3, 4) provide at least one annular configuration.

28. The heating unit according to claim 1, wherein said heaters define individual heated zones corresponding with said surface areas (13, 14), said heated zones overlapping each other in a border zone (15) provided between said surface areas (13, 14).

29. An electric heating unit comprising:
  at least one heating surface (2) defining separately heatable first and second surface areas for delivering thermal energy;
  at least two electric heaters (3, 4), each having an individual rated operating capacity and each mainly heating one of said first and second surface areas (13, 14); and
  control means (10) for alternately delivering operating power to each of said electric heaters (3, 4) to provide first and second temperature levels during heating operation, said control means (10) including temperature sensing means (7, 8),
  said control means separately thermally controlling said at least two surface areas (13, 14), said control means simultaneously substantially individually detecting and comparing withdrawal of thermal energy from said first and second surface areas, wherein said control means (10) operates as a detecting means for detecting presence of an article in the vicinity of said heating surface (2).

30. The heating unit according to claim 29, wherein ratios between said temperature levels of said surface areas define time periods of temperature ratios, said detecting means being provided to operate as a function of at least one of said time periods, the article being defined by a cooking utensil.

31. An electric heating unit comprising:
  at least one heating surface (2) defining separately heatable first and second surface areas for delivering thermal energy;
  at least two electric heaters (3, 4), each having an individual rated operating capacity and each mainly heating one of said first and second surface areas (13, 14); and
  control means (10) for alternately delivering operating power to each of said electric heaters (3, 4) to provide first and second temperature levels during heating operation, said control means (10) including temperature sensing means (7, 8), said control means separately thermally controlling said at least two surface areas (13, 14), said control means simultaneously substantially individually detecting and comparing withdrawal of thermal energy from said first and second surface areas, wherein said control means (10) simultaneously maintains said heaters (3, 4) in said heating operation, said operating power being alternately delivered to said heaters at a constant power value.

32. The heating unit according to claim 25, wherein said control means (10) switches from said maintained state to at least one of:
   separate operating levels; and
   periodically alternating operation of at least two of said heaters (3, 4) as a function of at least one of:
      a time duration and
      a temperature level.

33. The heating unit according to claim 25, wherein said simultaneously heating operation of said heaters occurs during an initial heating phase.

34. An electric heating unit comprising:
   at least one heating surface (2) defining separately heatable first and second surface areas for delivering thermal energy;
   at least two electric heaters (3, 4), each having an individual rated operating capacity and each mainly heating one of said first and second surface areas (13, 14), and
   control means (10) for alternately delivering operating power to said electric heaters (3, 4) to provide first and second temperature levels in heating operation, said control means (10) including temperature sensing means (7, 8),
   said control means (10) including temperature sensing means, said control means separately thermally controlling said at least two surface areas (13, 14) said control means simultaneously substantially individually detecting and comparing withdrawal of thermal energy from said first and second surface areas, wherein at least two of said electric heaters (3, 4) are juxtaposed in a common plane.

35. An electric heating unit comprising:
   at least one heating surface (2) defining separately heatable first and second surface areas for delivering thermal energy;
   at least two electric heaters (3, 4), each having an individual rated operating capacity and each mainly heating one of said first and second surface areas (13, 14); and
   control means (10) for alternately delivering operating power to each of said electric heaters (3, 4) to provide first and second temperature levels during heating operation, said control means (10) including temperature sensing means (7, 8),
   said control means separately thermally controlling said at least two surface areas (13, 14), said control means simultaneously substantially individually detecting and comparing withdrawal of thermal energy from said first and second surface areas, wherein at least one of elements provided by at least one of said electric heaters (3, 4) and at least one temperature sensor (11, 12) of said temperature sensing means (7, 8) is at least partly provided by a thick-film resistor substantially arranged in an alternating course.

36. An electric heating unit comprising:
   at least one heating surface (2) defining separately heatable first and second surface areas for delivering thermal energy;
   at least two electric heaters (3, 4), each having an individual rated operating capacity and each mainly heating one of said first and second surface areas (13, 14), and
   control means (10) for alternately delivering operating power to said electric heaters (3, 4) to provide first and second temperature levels in heating operation, said control means (10) including temperature sensing means (7, 8),
   said control means (10) including temperature sensing means, said control means separately thermally controlling said at least two surface areas (13, 14) said control means simultaneously substantially individually detecting and comparing withdrawal of thermal energy from said first and second surface areas, wherein only two of said electric heaters (3, 4) are provided, said electric heaters (3, 4) defining only two of said surface areas (13, 14) having annular configurations and defining an unheated center of said heating surface (2).

* * * * *